(12) United States Patent  (10) Patent No.: US 8,999,215 B2
Ditter  (45) Date of Patent: Apr. 7, 2015

(54) METHOD FOR PRODUCING A COVER (75) Inventor: Rolf Peter Ditter, Haslach i. K. (DE)

(73) Assignee: Ditter Plastic GmbH + Co. KG, Haslach I.K. (DE)

( * ) Notice: Subject to any disclaimer, the term of this patent is extended or adjusted under 35 U.S.C. 154(b) by 386 days.

(21) Appl. No.: 13/361,596

(22) Filed: Jan. 30, 2012

(65) Prior Publication Data

US 2012/0207977 A1 Aug. 16, 2012

(30) Foreign Application Priority Data

Feb. 11, 2011 (DE) .......................... 10 2011 011 028

(51) Int. Cl.
B29C 45/16 (2006.01)
B60K 37/06 (2006.01)
(52) U.S. Cl.
CPC ......... B60K 37/06 (2013.01); Y10T 428/24479 (2013.01)
(58) Field of Classification Search
None
See application file for complete search history.

(56) References Cited

U.S. PATENT DOCUMENTS

| | | | | | |
|---|---|---|---|---|---|
| 2,565,803 | A | * | 8/1951 | Danielson et al. | 264/135 |
| 3,086,250 | A | * | 4/1963 | Gits | 264/161 |
| 3,354,249 | A | * | 11/1967 | Morin | 264/161 |
| 4,155,972 | A | * | 5/1979 | Hauser et al. | 264/250 |
| 4,440,820 | A | * | 4/1984 | Shiho et al. | 428/120 |
| 5,469,758 | A | * | 11/1995 | Howie, Jr. | 74/553 |
| 5,688,461 | A | * | 11/1997 | Howie, Jr. | 264/273 |
| 6,133,248 | A | * | 10/2000 | Stella | 514/58 |
| 6,391,243 | B1 | * | 5/2002 | Howie, Jr. | 264/250 |
| 6,568,036 | B1 | * | 5/2003 | Howie, Jr. | 16/441 |

* cited by examiner

Primary Examiner — Edmund H. Lee
(74) Attorney, Agent, or Firm — Head, Johnson & Kachigian, P.C.

(57) ABSTRACT

A cover that is assembled from a front assembly (3+6) and a base element (2) is produced in that the front assembly including the front plate (3) and the light conductor pin (6) are integrally injection molded in two subsequent injection molding steps, while the base element (2) is injection molded remote there from. Subsequently, the two components which are arranged in the different tool halves (101, 102) are brought in alignment with one another with an index plate (103) and are joined through closing the tool and are preferably interlocked with one another.

8 Claims, 8 Drawing Sheets

METHOD FOR PRODUCING A COVER

I. FIELD OF THE INVENTION

The invention relates to plastic covers as required for components in dashboards of motor vehicles, in operator interfaces of machine controls and for many industrial applications in large numbers. A cover can thus be a permanently mounted aperture like a moveable actuation element, e.g. a push button, a turn controller or a turn switch or any other element which is configured to cover components arranged there behind.

II. BACKGROUND OF THE INVENTION

Covers of this type for automotive applications in dashboards have to be high quality, thus not only sized correctly, but also very high quality with respect to the surface structure and the imprimation edges.

Covers of this type are typically not only made from a front plate providing the actual cover function but also from a base element extending from the backside of the front plate in depth direction, so that the front plate and the base element together provide a three-dimensional cover which is stable enough by itself for handling and assembly purposes and in which additional functions can be integrated.

For this purpose, the front plate is typically made from transparent material and is covered with a light permeable layer on its front side which is only interrupted where a light permeable, in particular backlit portion, shall be provided in the cover. For this purpose, the non light permeable layer is initially applied fully covering the surface of the front plate and subsequently removed again in the desired portions e.g. through laser impact.

An additional function of this type is e.g. the configuration of pass-through openings extending in the depth direction of the cover, in particular of the base element of the cover which can be closed on the front side by the front plate or can also be left open.

The pass-throughs that are open on the front side are used e.g. for inserting switches, actuation knobs which themselves in turn can form a cover according to the invention or similar from the front side of the cover, while the blind hole channels that are closed on the front side by the front plate have other functions and typically are not only used for stabilizing the base element.

Thus, e.g. portions of the cover, e.g. particular blind holes are backlit from the backside of the cover e.g. by LEDs which are arranged in a respective position on a circuit board arranged behind the cover.

In particular when the portion to be illuminated in the front plate of the cover is relatively small and due to the extension into the depth of the cover, the illuminating LED is relatively far behind the front plate, e.g. 1 to 2 cm or more, the illumination effect on the front plate is too small.

For this purpose, it is known to arrange a typically pin shaped light conductor made from plastic material in the dead hole of the cover, wherein the light conductor bridges the distance between the illuminating LED and the front plate that is light permeable in this portion in order to let a greater light volume reach the front plate. The light conductor pins are thus typically made from a transparent light permeable plastic material and the light conductor effect typically includes that at the side surfaces of the light conductor pin that extend along the light conductor pin, a reflection of the impacting light occurs and the light is reflected back into the light conductor.

In this context, it is already known that the light conductor function of the light conductor pins is less when the light conductor pins are produced through filling the dead hole channel with transparent plastic material through an injection molding method, thus the light conductor pins are melted together on their entire lateral surfaces with the surrounding walls of the dead hole, thus of the base element of the cover.

A melting together of the front face surface and/or of the front portion of the side surfaces of the light conductor pin, in particular with the backside of the front plate however is essentially harmless since a pass-through of the light rays is particularly desirable at this location.

Therefore, it is known to produce the cover and the light conductor pins separately, in particular produce them through injection molding and subsequently insert the light conductors from behind into the dead holes that are open in the back, where they are typically interlocked through friction locking or form locking of light conductor pin and dead hole.

This, however, means high logistics complexity and assembly complexity since the cover and light conductor pins initially have to be produced separately, though also possibly in the same injection molding tool, subsequently the light conductor pins have to be removed from the injection mold, stored in an intermediary manner, shipped to the assembly location, aligned correctly with the dead hole channel and inserted into the dead hole channels. Whether this is performed manually or automatically, the complexity is very high, also for automated assembly in particular the investment for extraction devices, assembly devices, transport devices, storage devices, etc., in particular for the up to 20 light conductor pins or more per cover is very high.

Another problem in this context is that covers of this type with respect to the shape of the face of the front plate typically are not flat but have a camber which can not only be provided in one spatial direction but in two spatial directions as it is often the case for covers for the dashboards for motor vehicles.

Since, due to injection molding reasons, the camber of the face side of the front plate is typically also provided on the backside of the front plate in order to provide and even wall thickness of the front plate and the light conductor pins shall contact the backside of the front plate with its faces surface, this means that light conductor pins that are to be inserted into a cover of this type, which can also be 10, 20 or more light conductor pins are not identical with one another, but respectively slightly different with respect to length, camber of the face surface, positioning of the snap-locking elements in their longitudinal extension etc.

This means that the light conductor pins are not exchangeable among one another with respect to the particular dead hole channels and due to the small dimensions of the light conductor pins, thus a length of 1 to 2 cm and a transversal extension of a few millimeters, the existing differences between the light conductors are so small that they typically cannot be detected with bare eyes. When subsequently assembling the light conductor pins in the respective dead hole channels of the cover, this typically leads to mix-ups when the light conductor pins are not separated from one another right from the beginning according to their types and even then mix-ups still occur.

However, when an incorrect light conductor pin is pressed into a dead hole channel during assembly, this is additionally often not recognized during assembly since the physical differences between the particular light conductors are very small.

This error typically only becomes apparent later, either because the subsequent assembly of the cover configured with light conductors is not possible in a surrounding component or it comes to damages either at the cover or at the incorrectly used light conductor or at the receiving component surrounding the cover.

For vendors that deliver covers for a larger sub-assembly, this causes great difficulties when reject parts due to incorrectly inserted light conductor pins are not detected and an deficient part is delivered to the customer.

III. DETAILED DESCRIPTION OF THE INVENTION a) Technical Object

Thus, it is the object of the invention to provide a method for producing covers with light conductor pins that are injection molded together with the front plate which reduces manufacturing complexity in spite of good light conduction with only small light losses. Furthermore, a suitable tool and a respective cover shall be provided.

b) Solution

This object is achieved through the features 1, 9 and 12. Advantageous embodiments can be derived from the dependent claims.

For the present solution, the front plate with the light permeable light conductor pin is directly integrally molded in one or two subsequently performed injection molding steps. Thus, preferably the front plate is made from light permeable plastic material and the light permeable light conductor pin penetrates through the thickness of the front plate up to its front side and is thus integrally injection molded in its front portion at the circumferential surfaces with the front plate.

This has the first advantage that differently from applying the light conductor pin to the backside of the front plate, the front plate right from the beginning can be preferably injection molded from non light permeable material and therefore it is not mandatory that a light permeable coating is additionally applied subsequently to the otherwise non light permeable front plate. The light conduction of the light conductor pin is still very good, since the light conductor pin is only glued together in its small front portion at its side surfaces with the front plate, otherwise the side surfaces are not glued together with the surrounding components.

After producing the front assembly, including the front plate and the at least one light conductor pin, the base element that is injection molded remote there from in the same tool, wherein the base element includes a channel that is open for receiving the at least one light conductor pin at least from its front side to its backside is directly pushed over the light conductor pin in the tool from behind and moved close to the backside of the front plate far enough so that the base element is permanently connected with the front assembly either through form-locking interlocking or through form-locking compression or in another manner which completes the cover.

This is achieved in that after opening the tool, either the base element or the front assembly is axially moved out of the rest of the tool through an axially movable tool component and moved in transversal direction so that the component is in a position that is aligned with the other component to be assembled with the first component.

By subsequently closing the tool itself or extending a tool slide, the two components are then axially inserted into one another.

The advantage of this method is that during assembly of the cover, thus inserting the components into one another, only two components have to handled, namely the front assembly on the one hand side and the base elements on the other hand side.

In the cover which includes much more than a light conductor pin which is very often the case, for another method in which the base element and the front plate together form an assembly into which light conductor pins are subsequently mounted, a very large number of light conductor pins would need to be handled, which all have to be inserted with a very precise fit into the channels of the base element which are only slightly larger, which is much more difficult to perform in the tool.

For the described method, preferably a tool half, in particular the ejector tool is configured rotatable about the axial direction.

Thus, the base element, the front plate and the light conductor pins are injected in different sections of the same tool.

One option is that the front assembly remains in the first tool half after injection molding and the base element remains in the other tool half when the tool is opened and subsequently one of the two components is brought into an aligned position with the other component through an axially extensible and transversal movable tool component so that the subsequent closing of the tool causes the two components to be axially inserted into one another.

The other option is that after injection molding the front assembly on the one hand side and the base element on the other hand side remain in the same tool half when the tool is opened. Also here subsequently one of the components initially has to be axially moved out of the front surface through a movable tool component and subsequently has to be moved in transversal direction so that it is aligned with the other component to be assembled.

Through the subsequent axial insertion of the moveable tool component and/or closing the tool the 2 components to be assembled are axial inserted into one another.

However the orientation of the base element is different for both solutions. While in the first case the base element is oriented with its forward face to the contact surface between the 2 tool halves, in the second case this depends from which of the 2 moveable tool components is initially axially extended and brought into aligned position with the other component.

Instead of a transversal movement through a moveable tool component thus a rotation about an axially aligned axle or a transversal movement, a reversal plate can also be used as it is typically arranged between the two tool halves and which is pivotable by 180° about an axis transversal to the axial direction, wherein one of the components to be assembled remains in the reversal plate before the assembly.

A typical case of a transversally moveable tool component is an index plate which is rotatable about and axial axis in particular rotatable about its center axis, in particular rotatable about 180°. Then one of the two component positions of the index plate is the assembly position.

In order to achieve the desired axial movement when sliding the 2 components into one another either the 2 tool halves can be moved into one another in their entireties, preferably until they contact or a separate tool component configured as a tool slide is moved mechanically, hydraulic or pneumatically with respect to the 2 tool halves supporting it and thus slides one of the 2 components in a direction towards the other component.

Thus, an injection molding tool with two tool halves, in particular an ejector tool and a nozzle tool is required for this method wherein the tool is configured in particular as follows.

On the one hand side both tool halves have to have at least 2 sections, wherein at least one injecting cavity is included in each section. Furthermore a tool half in particular the ejector tool must be rotatable in a controlled manner about the axial direction, in particular its center axis from one section to the next. When there are only 2 sections the tool half must be pivotable back and forth or rotatable within 180° increments.

Furthermore one tool half, preferably the non rotatable tool half, e.g. the nozzle tool must include a tool component which is axially moveable out of the contact surface of the tool and provides the transversal movement of a component in extended condition:

it either has to be pivotable about the axial direction, e.g. the center axis of the tool component, or it has to be moveable in transversal direction, or it has to be pivotable about an axis transversal to the axial direction, in particular pivotable by 180°.

Through this moveable tool component the two injection molded components are brought into an aligned position before being assembled.

This moveable tool component can only be provided in one of the sections and is e.g. an index plate that is rotatable about its axial center axis.

Additionally for sliding the two injection molded components together in one tool half, in particular the non rotatable tool half, a tool slide can be provided at least in one section wherein the tool slide is moveable in axial direction and in alignment with the assembly position, e.g. positioned in the moveable tool component.

For additional process steps a material removing tool unit can be additionally provided in at least one of the tool halves, a milling unit, a drilling, a turning unit or a laser unit as well as processing units e.g. a gluing unit.

With this method and/or the described tool a cover made from injection molded plastic can be produced in which:

the at least 1 light permeable light conductor pin permeates the front plate and reaches to its front side and is melted together in the front end portion laterally circumferential with the front plate, the light conductor pin over its remaining extension is neither melted nor glued together with the walls of the surrounding base element and the base element is connected with the front assembly, in particular the front plate in particular interlocked.

Thus, very good light conduction from the rear end of the light conductor pin into the front side of the front plate is provided.

Additionally, the base element can be made from light impermeable material, in particular black or white material and also the front plate can be injection molded right from the beginning from non-transparent material and thus not have to be provided with a light impermeable coating on the front side.

When the light conductor pins and/or the channels taper in the base element from the front end to the rear end, in particular taper conically connecting the two components can be provided through friction locking and without interlocking.

c) Embodiments

Embodiments according to the invention are subsequently described in an exemplary manner with reference to the drawing Figures, wherein

Figure 1A:
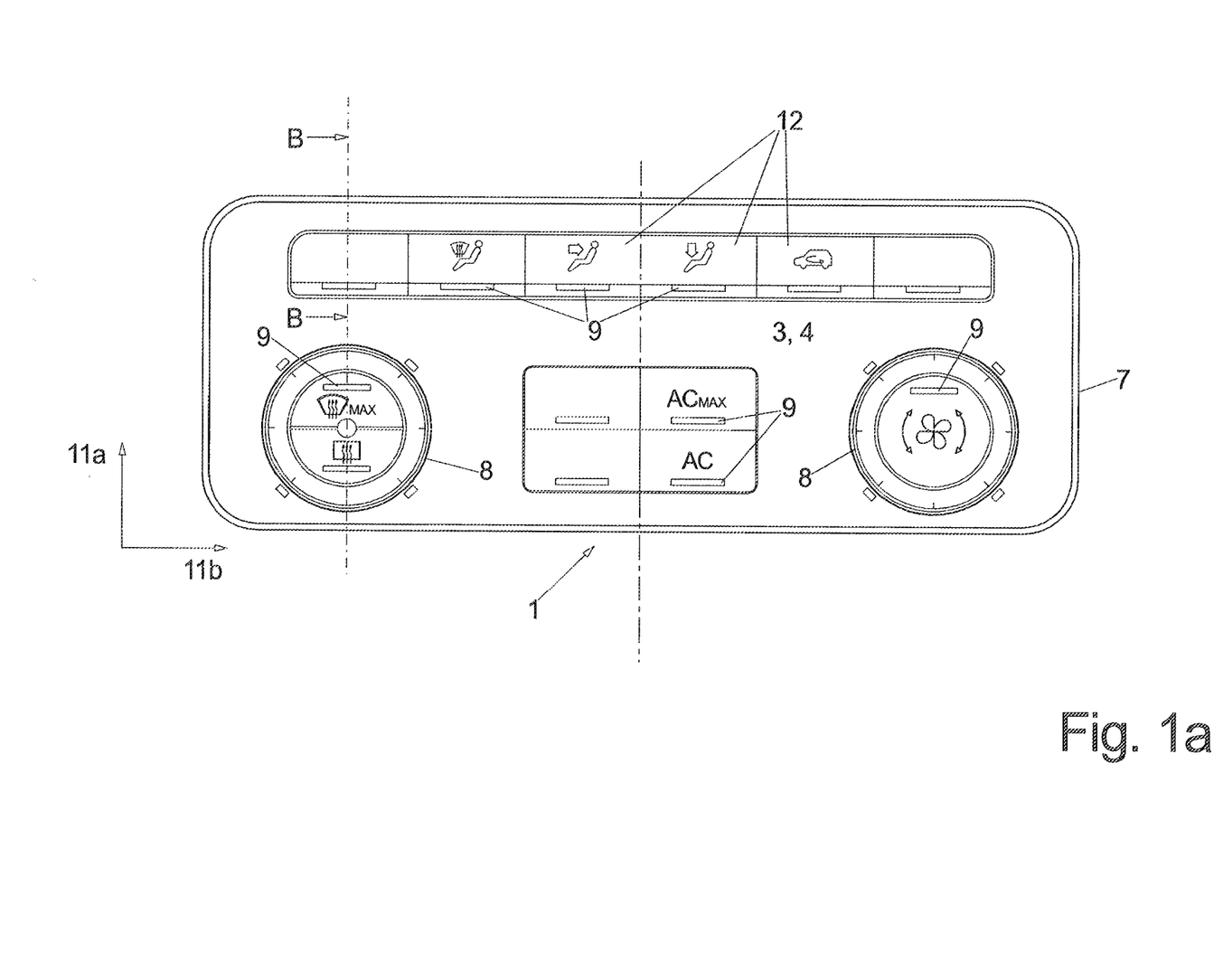
FIG. 1a: a completely mounted front cover.

FIG. 1a illustrates a typical application of the cover according to the invention, namely an actuation cover 1' in the dashboard 7 of a motor vehicle.

As illustrated in the front view of the actuation cover in FIG. 1a, the actuation cover typically includes a plurality of push buttons 12, either in rectangular form or in semicircular form within the three circular operating units which are respectively associated with backlightable functional indicators 9. The functional indicators 9 are partially arranged under the push buttons 12 like for the rectangular push buttons, partially also within the push buttons 12 themselves like in the semicircular push buttons.

From this illustration, it becomes apparent that the individual functional indicators 9 respectively have to be backlightable from behind and when illuminating one of the functional indicators 9, a functional indicator located adjacent thereto must not receive any light. This can only be facilitated by functional indicators 9 that are insulated towards their sides.

Figure 1B:
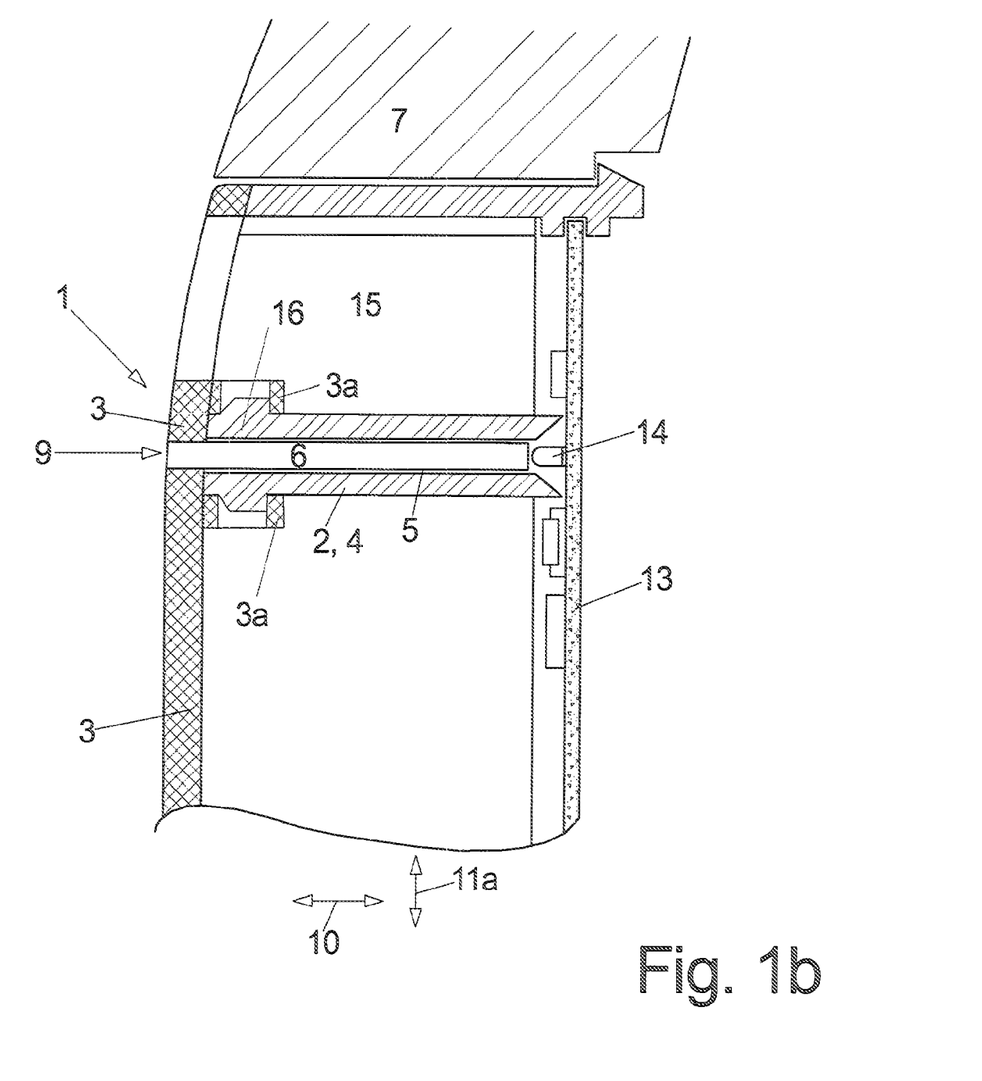
FIG. 1b: a cover according to the invention in a longitudinal sectional view.

The cover according to the invention can be the actuation cover 1' or also one of the push buttons 12. Subsequently, one of the semicircular push buttons is illustrated as an example for a cover 1 according to the invention, thus in FIG. 1a, the left push button 12 according to the line B-B in a longitudinal view. In FIGS. 1b and 2c, d, it is illustrated in perspective views, however the principles described therein also apply for any other cover, either a rectangular push button 12 or the actuation cover 1' which is not movable after the assembly.

The cover includes the so-called front assembly which on the one hand side includes the front plate 3 which is approximately semicircular and the transparent light conductor pin 6 made from light permeable plastic material which protrudes in backward direction from the front plate 3, wherein the light conductor pin already starts at the front side of the front plate 3 and reaches through the front plate 3 and is integrally molded with the front plate 3 in the thickness portion of the front plate 3.

The front plate 3 can further include protrusions 3a which extend backward remote from the light conductor 6, wherein the protrusions are typically integrally produced in one piece together with the front plate 3 and are made from a non-transparent material like the front plate 3.

Figure 2A:
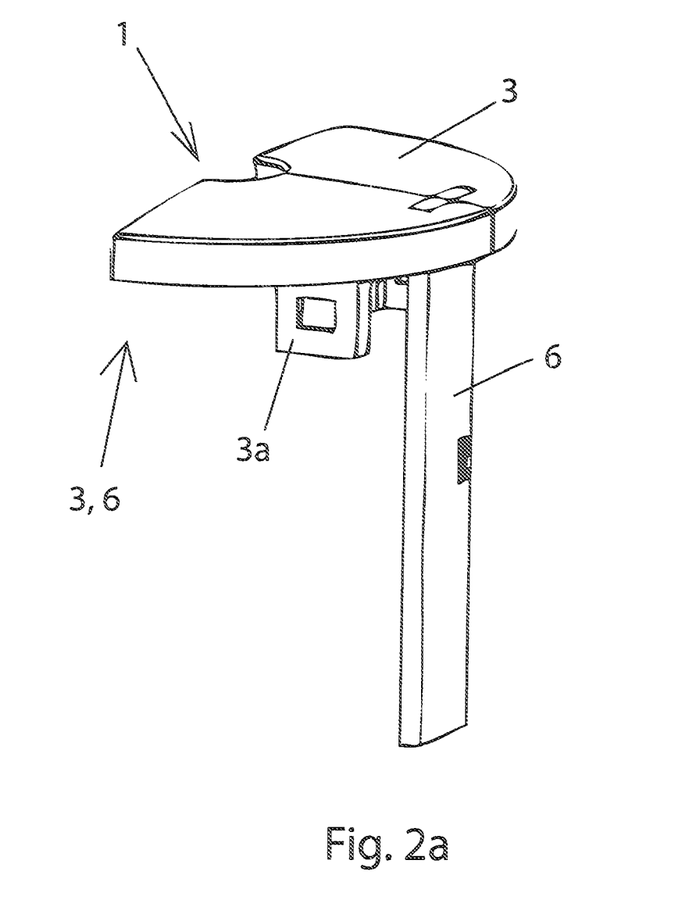
FIG. 2a, b: the front assembly in different perspective views.
Figure 2B:
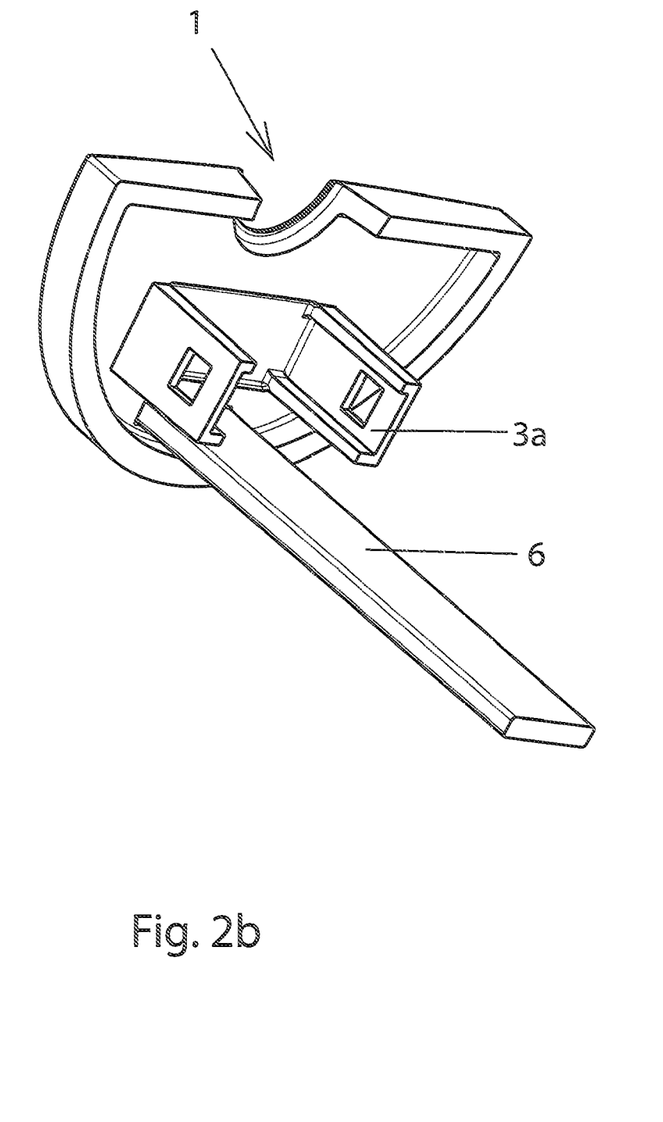
Figure 2C:
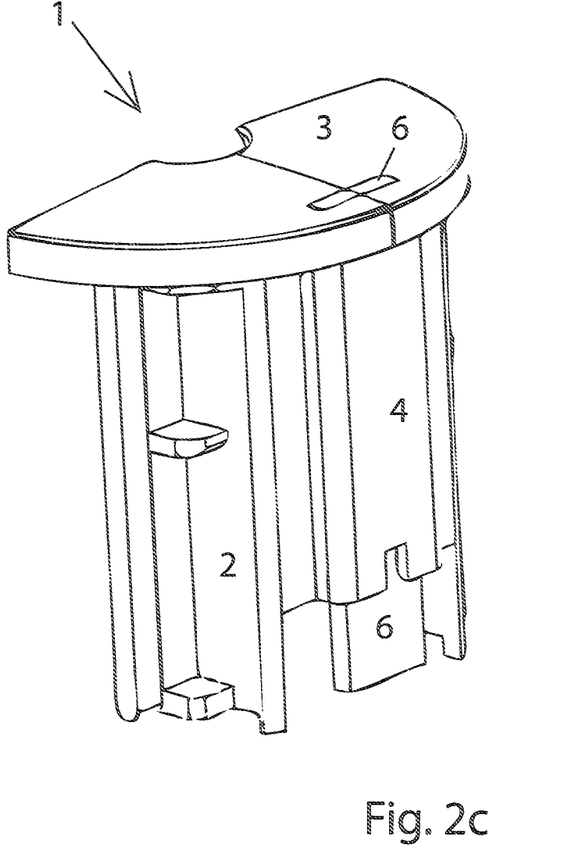
FIG. 2c, d: the cover of the ejector tool of the injection molding tool from the contact surface.

The front assembly 3+6 is illustrated in FIG. 2a and FIG. 2b.

A base element 2 is slid over the front assembly 3+6 from the backside, thus onto the free end of the light conductor pin 6, wherein the base element among other things includes a sleeve 4 which has a hollow interior into which the light conductor pin 6 fits and circumferentially completely envelops the sleeve.

Figure 2D:
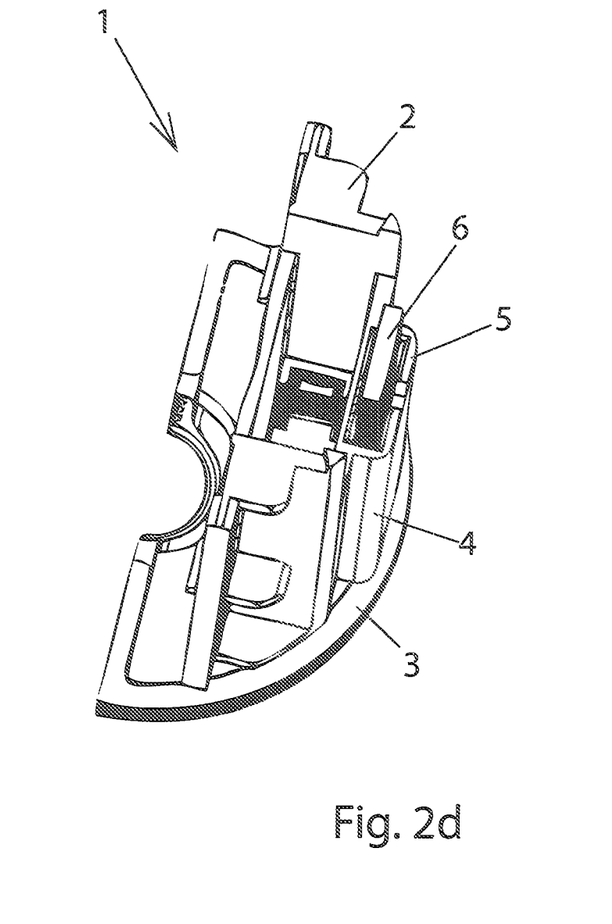

As illustrated in FIGS. 2c and 2d, the base element 2 with its sleeve 4 is pushed with the pass-through opening over the light conductor pin 6, until the front face of the is base element 2 contacts the backside of the front plate 3 and is fixated therein, e.g. interlocked in that respective engagement lugs interlock in the interlocking openings of the protrusions 3a of the front plate 3.

FIG. 1b illustrates the finished assembly 1 in a longitudinal sectional view, thus with a slot extension in depth direction from the front plate 3 backward.

Thus, only the sleeve 4 of the base element 2 is illustrated, wherein the sleeve 4 interlocks with its engagement lugs 16 in the interlocking openings of the extensions 3a of the front plate 3 as soon as the base element 2 is pushed forward until it contacts the backside of the front plate 3.

Since the channel 5 that is open in the front and in the back in the sleeve 4 of the base element 2 has a slightly larger cross-section than the light conductor 6, the light conductor 6 has a circumferential distance from the base element 2.

The light which has been introduced into the light conductor by an LED 14 which is arranged on a circuit board 13 behind the rear end of the light conductor pin 6 is conducted very well to the front end through total reflection at the side surfaces of the light conductor pin 6 and only small light components transition into the surrounding base element 2.

At the injection molded thus melted contact locations of the light conductor pin 6 in the front portion towards the surrounding front plate 3, light is absorbed by the front plate 3, but because of the small surface, these are only insignificant portions.

Thus, the major portion of the introduced light will be visible on the front face 6 and thus on the functional indicator 9.

Figure 3A:
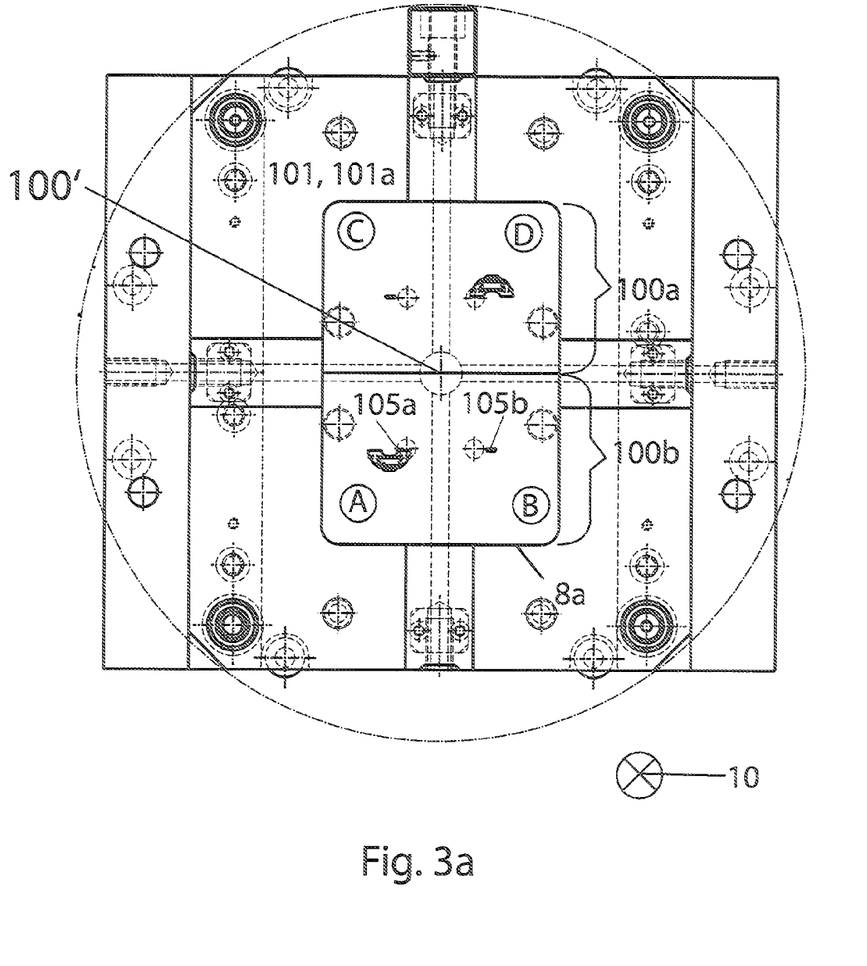
FIG. 3a: a top view of the ejector tool from the contact surface.
Figure 3B:
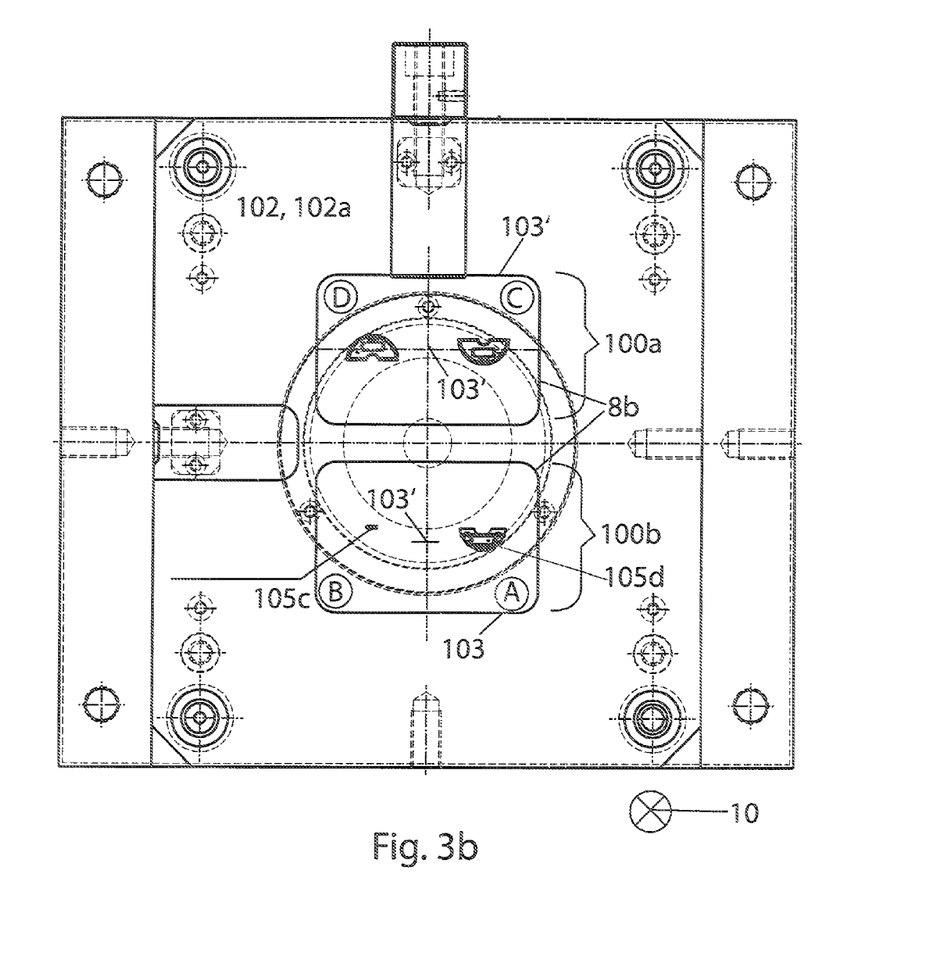
FIG. 3b: a top view of the nozzle side of the injection molding tool from the contact surface.

FIGS. 3a and 3b describe the method of producing the cover 1 which in addition to injection molding the components also includes assembly which shall also be automatically performed in the tool.

FIGS. 3a and 3b respectively illustrate the contact sides of the respective tool halves which are pressed against one another during the injection molding process and thus form cavities that are internally enclosed at all times for injecting the plastic material.

Thus, a tool half, typically the nozzle tool 102 is locally fixated in the machine. Through the tool half, the liquid plastic material is injected, this means from the backside or from the sides of the tool half injection channels run to the cavities in the injection molding tool.

The other tool half is designated as ejector tool since the cavities are positioned with respect to the contact surface between the two tool halves typically so that after opening the tool, the completely injected components remain in the extractor tool which is movably arranged in the machine and in axial direction, the depth direction 10, the ejector tool can be placed at a distance with respect to the nozzle tool 102. Subsequently, axially movable plungers that are included in the ejector tool 101, wherein the plungers are arranged behind the cavities and this behind the injected work pieces are moved forward and thus eject the injected work piece out of the contact surface of the ejector tool.

The cavities for injecting the work pieces are arranged within the form portion 8a, b. The visible elements arranged outside thereof are guides and other functional elements for closing the injection molding tool 100.

In the present case, the ejector tool 101 is pivotable back and forth or rotatable about its center axis 100' in 180 degree increments and has the same cavities 105a, b in the same arrangement and thus in two sections 100a, b on both sides of its transversal center.

Thus in the ejector tool 101, there is a total of four cavities, also designated as stations A-D.

In the first injection molding step, the base element 2 is injection molded in the lower section 100b in the station A and the cavity 105 arranged therein and simultaneously the light conductor pin is injection molded adjacent thereto in the station B in the cavity 105b.

Thus, the cavity 105a is positioned in axial direction 100' so that after opening the tool the base element 2 remains in the ejector tool 101, while the light conductor pin 6 remains in the nozzle tool 102.

After this first injection molding step and certainly in open condition of the tool, the ejector tool 101 is rotated by 180 degrees about its center axis 100' and subsequently the tool 100 is closed again, thus the ejector tool 101 is moved so that it contacts the nozzle tool 102.

Out of the components injected in the first injection molding step in the stations A and B, the light conductor pin 6 is now disposed in station C and the front plate 3 is injection molded in the first injection molding step about the light conductor pin 6.

The base element 2, however, is now arranged in the station D and in this second step no additional machining is provided at the base element.

Simultaneously also in this second injection molding step, a base element 2 and a light conductor pin 6 can be simultaneously injection molded again in the stations A and B.

Subsequently, the tool 100 is opened again, thus the ejector tool 101 is moved at a distance to the nozzle tool 102, wherein the finished front assembly 3+6 remains in the upper half in the station C of the nozzle tool 102 and is oriented with the free rear end of the light conductor pin 6 in a direction towards the ejector tool 101.

At the station D in the ejector tool 101, the base element 2 still remains and is oriented with its front face towards the nozzle tool 102.

In the nozzle tool 102 which also includes a section 100a, b which is arranged above and below the center line, the cavities 105c, 105d respectively provided in the two sections are respectively arranged in an individual index plate 103 which is movable forward in axial direction from the nozzle tool 102 beyond its contact surface 102a and pivotable or rotatable by 180 degrees about the center axis 103' extending in axial direction 100'.

Through the index plate 103 which is arranged in the upper section 100a for the time being, this way the front assembly 3+6 which is initially still in the station C is pivoted through pivoting about the center axis 103' by 180 degrees into the station D of the nozzle tool 102 and thus is in alignment with the base element 2 that is already arranged in station D in the ejector tool 101.

The subsequent closing of the tool, thus moving the ejector tool 101 to the nozzle tool 102 slides the base element 2 arranged in the station D over the light conductor 6 that is also arranged in station D on the other tool half of the front assembly 3+6, until the base element 2 interlocks at the backside of the front plate 3 and finishes the cover 1.

Subsequently the tool 100 is opened again wherein the finished cover 1 initially remains in the station D of the ejector tool 1 and is ejected there from through an ejector which is not illustrated in more detail.

This way, the cover 1 that is fully automatically made from plural components is not only produced as injection molded component but also assembled completely.

REFERENCE NUMERALS AND DESIGNATIONS

1 Cover
1' Actuation cover
2 Base element
3 Front plate
3a Front side
4 Sleeve
5 Channel
6 Light conductor pin
7 Dashboard
8a, b Mold portion
9 Functional indicator
10 Depth orientation
11a, b Transversal orientation
12 Push button 13 Circuit board
14 LED
15
16 Engagement lug
100 Injection molding tool
100' Axial direction center axis
100a, b Section
101 Ejector tool, tool half
101a Contact surface
102 Nozzle tool, tool half
102a Contact surface
103 Tool component, index plate
103' Center axis
104 Tool slide
105a, b, c Cavity
106 Support bushing
107 Base plate
108 Teething
109 Gear rack
110 Injection nozzle
111 Connection channel

What is claimed is:

1. A method for producing a cover made from injection molded plastic material including:
   a front plate (3) and at least one light conductor pin (6) from light permeable plastic material integrally connected therewith in one piece, wherein the light conductor pin extends from a front side of the front plate (3) through the front plate and beyond the backside of the front plate;
   a base element (2) made from non-light permeable plastic material which extends from the backside of the front plate (3) towards the back about the at least one light conductor pin (6), wherein the method comprises the following steps sequentially performed through an injection molding tool 100:
   a) the front plate (3) and the at least one light conductor pin (6) are directly molded together in the same tool in a single injection molding step or in two injection molding steps occurring after one another;
   b) the base element (2) is injection molded remote from a front assembly (3+6) including the front plate (3) and the light conductor pins (6) in the same tool (100);
   c) after opening the tool (100), either the base element (2) or the front assembly (3+6) is axially moved out of the rest of the tool through a movable tool component (103);
   d) the tool component (103) with the base element (2) or the front assembly (3+6) axially moved out is moved transversally so that the base element (2) is in an aligned position with the at least one light conductor pin (6);
   e) the tool (100) is closed and thus the base element (2) with its at least one channel (5) is pushed over the at least one light conductor pin (6) in a direction towards the front plate (3) and interlocked with the front plate (3) on the backside of the front plate (3); and
   f) after opening the tool (100) the cover (1) is removed.

2. The method according to claim 1:
   wherein the one tool half of the tool (100) is rotatable about the axial direction (100'); and
   wherein the base element (2), the front plate (3) and the light conductor pin (6) are injected in various sections (100a, b) of the same tool (100).

3. The method according to claim 1, wherein after injection molding the light conductor pin (6) and the front plate (3) in one tool half, they remain in the one tool half and the base element (2) after being produced in the other tool half remains in the other tool half.

4. The method according to claim 1,
   wherein the base element (2) after injection molding remains in the tool half in which also light conductor pins (6) and the front plate (3), thus the front assembly have remained;
   wherein the base element (2) is produced with front faces that are oriented into this tool half;
   wherein the tool component (103) is arranged in the same tool half.

5. The method according to claim 1, wherein the injection molding tool (100) includes a reversal plate between the two tool halves, wherein the reversal plate is pivotable about an axis transversal to the axial direction (100') by 180 degrees, and either the base element (2) or the front assembly (3+6) remain in the reversal plate after injection molding and are brought into a position that is aligned with the other component (5) through pivoting the reversal plate.

6. The method according to claim 1, wherein the tool component (103) is an index plate (103) which is rotated about its axial axis.

7. The method according to claim 1, wherein a tool slide (104) is moved mechanically, hydraulically or pneumatically, in axial direction with respect to the supporting tool (100) in order to slide the two components into one another.

8. The method according to claim 1, wherein the base element (2) is interlocked in a form locking manner at the backside of the front plate (3) and/or pressed in a friction locked manner.

* * * * *